United States Patent [19]

Stoll

[11] Patent Number: 5,136,781
[45] Date of Patent: Aug. 11, 1992

[54] METHOD OF PRODUCING A SEALING RING

[75] Inventor: Kurt Stoll, Esslingen, Fed. Rep. of Germany

[73] Assignee: Festo KG, Esslingen, Fed. Rep. of Germany

[21] Appl. No.: 629,235

[22] Filed: Dec. 18, 1990

[30] Foreign Application Priority Data

Feb. 10, 1990 [DE] Fed. Rep. of Germany ....... 4004052

[51] Int. Cl.$^5$ ................................................ B21C 21/20
[52] U.S. Cl. ........................................ 29/888.3; 72/334
[58] Field of Search ......... 29/888.3, 888.072, 888.073, 29/527.1, 527.4; 264/136; 277/227; 72/334, 340

[56] References Cited

U.S. PATENT DOCUMENTS

| | | |
|---|---|---|
| 1,216,282 | 2/1917 | Carver et al. .................. 72/267 |
| 3,667,504 | 6/1972 | Wittren et al. ................ 137/625.69 |
| 3,774,277 | 11/1973 | Bentley-Leek ................. 29/888.3 |
| 4,076,262 | 2/1978 | Deventer ....................... 277/227 |
| 4,579,352 | 4/1986 | Adang ........................... 277/227 |
| 4,749,201 | 6/1988 | Hunger .......................... 272/227 |
| 4,860,567 | 8/1989 | Askey et al. ................... 72/254 |

FOREIGN PATENT DOCUMENTS

| | | |
|---|---|---|
| 2503807 | 12/1984 | Fed. Rep. of Germany . |
| 3443220 | 4/1986 | Fed. Rep. of Germany . |
| 3442463 | 5/1986 | Fed. Rep. of Germany . |

*Primary Examiner*—Irene Cuda
*Attorney, Agent, or Firm*—Flynn, Thiel, Boutell & Tanis

[57] ABSTRACT

A method of making sealing ring, for use in valves includes producing a cylindrical pressed cup from a film, and then slicing the cup in a direction normal to its longitudinal axis.

9 Claims, 2 Drawing Sheets

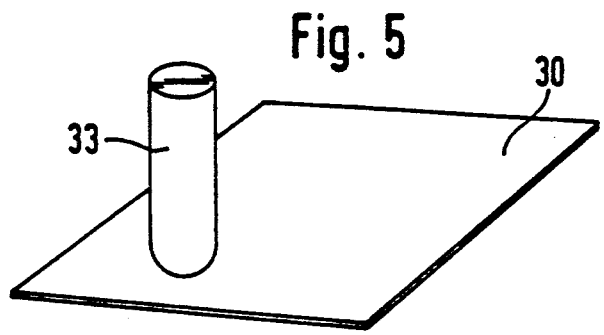
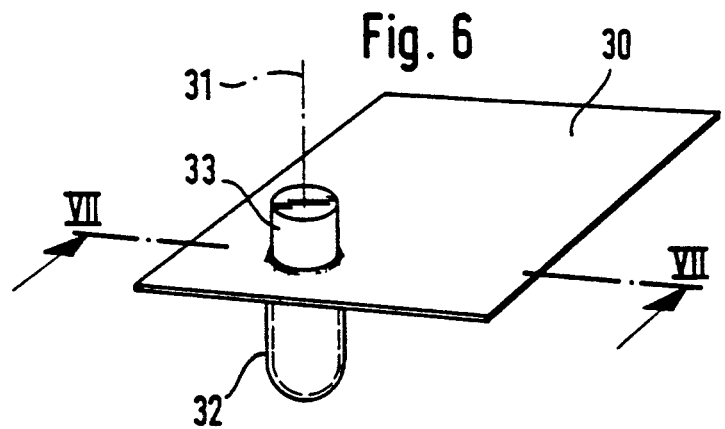
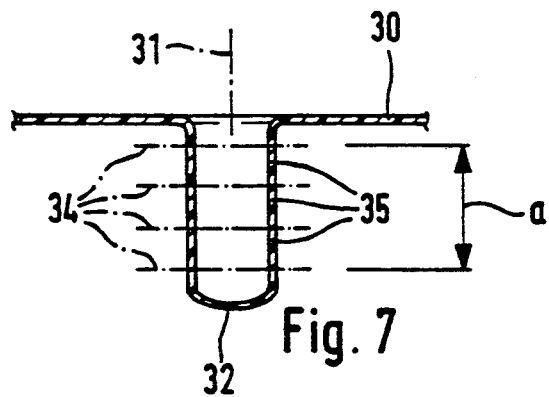
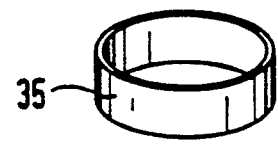

METHOD OF PRODUCING A SEALING RING

FIELD OF THE INVENTION

The invention relates to a sealing ring adapted to be located in a depression in a moving valve member and/or part of a valve housing accommodating the valve member of a valve and which has an annular sealing member received at least partly in the depression in the operational state. Furthermore in this respect, the invention relates to a method for producing the sealing ring.

BACKGROUND OF THE INVENTION

In the case of valves, and more particularly multiway valves with a piston- or spool-like valve member located in a receiving recess, there are particular problems related to wear. In order to provide a sealing effect between the valve member and the housing part of the valve defining the recess, it is necessary to provide sealing rings held on the valve member or on the valve housing part so as to surround the valve member and which in operation have to perform relative motion, while contacting the respectively other element, with respect to the latter. Since on the valve member or a part thereof in sliding contact with the respective sealing ring there are generally grooves, ledges, shoulders, ports of ducts and the like in the form of irregularities in the surface, there is pronounced wear on the sealing ring where it makes contact with the edges of such interruptions in the surface. The resulting impairment of the surface of the sealing ring leads to a reduction in the ability of the sealing ring to perform its function so that frequent replacement of the sealing ring and interruptions in operation of the valve are necessary.

SHORT SUMMARY OF THE PRESENT INVENTION

One object of the present invention is to provide a sealing ring of the type initially mentioned, which is less liable to wear in the applications noted.

A further object of the invention is to provide a sealing ring which has a longer reliable sealing action. A still further aim of the invention is to provide an advantageous method for the production of such a sealing ring.

In order to achieve the first object on the inner or outer circumferential surface of the valve's sealing member, which is opposite to the floor of the recess in the operational position there is an anti-friction layer of the material which is harder than the material of the sealing member. It is in this manner that with respect to its sealing member, which is arranged at least partly in the retaining depression and consists of a softer elastic material, the sealing ring is firmly held and at the same time is able to provide an excellent sealing action on the surface of the recess. The material, which is harder than the material of the sealing member, of the anti-friction, is able to be located at that position of the sealing ring, which during operation is subject to a dynamic contact with a component able to be move in relation to it, that is to say the valve member or a part of the valve housing. Owing to the selection of the material this anti-friction layer is more resistant to wear than the material of the sealing member so that there is practically no possibility of damage during operation. Furthermore surface irregularities such as transitions between the different materials, edges of valve duct ports or the like are not able to damage the sealing ring during its sliding motion. Nevertheless the anti-friction layer presents sufficient sealing properties in order to provide a sealing effect between the relatively moving component. In this respect the elastic sealing member arranged between the anti-friction layer and the floor of the retaining recess has a very beneficial effect which permits radial yielding motion of the anti-friction layer to a certain extent so that the latter is able to adapt itself to the form of the surface of the relatively moving component. The anti-friction layer is practically pressed resiliently against the component, which is in sliding contact with the stationary component.

Advantageous further developments of the invention are defined in the dependent claims.

The anti-friction layer may advantageously be a sealing member cover, which is more particularly applied in the form of a coating and is molded possibly sprayed onto the sealing member. If there is a practically integral material connection between the anti-friction layer and the sealing member, there will be a very long working life.

In the case of a further working embodiment of the invention the anti-friction layer is set in a depression in the sealing member and is therefore embedded in the material of the sealing member. It is in such a manner that projections or edges in the transition between the anti-friction layer and the member may be avoided, this being beneficial with respect to the working life.

The anti-friction layer is preferably an undivided annular member which surrounds the sealing member radially internally and/or externally coaxially and which may for instance have the form of a thin metal strip or band, which is made in the form of an annular member. For instance the anti-friction layer may be a film ring manufactured of film material. Like the sealing member the anti-friction layer will more particularly consist of synthetic resin material, in which respect however the above mentioned differences in strength are present. The sealing member may conveniently be elastomeric material, whereas the anti-friction ring may for instance consist of a harder polyester elastomer.

In order to facilitate fitting of the sealing ring which has a reduced elasticity owing to the presence of the anti-friction layer it is possible for the component, which has the retaining depression, to be radially divided in the depression that is to say the component has a complete radial division. It is in this manner that the sealing ring may be inserted in the divided state of the component axially into one of the sections of the depression, whereafter the depression is completed by application of the other section of the component.

A design is particularly advantageous in which the anti-friction layer is curved so that as seen in the cross section of the sealing ring it curves away from the sealing member.

In accordance with an advantageous method for the manufacture of the sealing ring the first step is to produce a cylindrical dent, for instance by using a punch, in a foil or the like consisting of the material of the eventual anti-friction layer, whereafter this dent is sliced layer-wise and transversely so that annular rings of film are produced which are later able to be secured to the respective sealing member to form the anti-friction layer.

A further, more detailed account of the present invention will now be presented with reference to the accompanying drawings.

FIGS. 5 to FIG. 8 show different method steps in the production for making the anti-friction layer provided on the sealing ring in a preferred manufacturing process.

DETAILED DESCRIPTION OF WORKING EMBODIMENTS OF THE INVENTION

Figure 1:
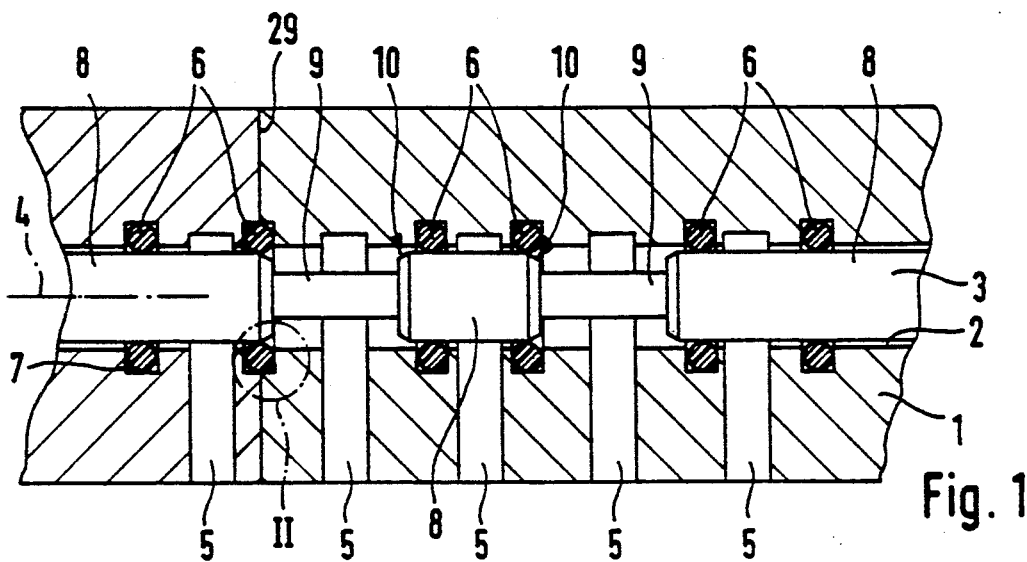
FIG. 1 shows part of a valve which is represented in longitudinal section and which is fitted with sealing rings in accordance with the invention, which are however only indicated diagrammatically.
Figure 4:
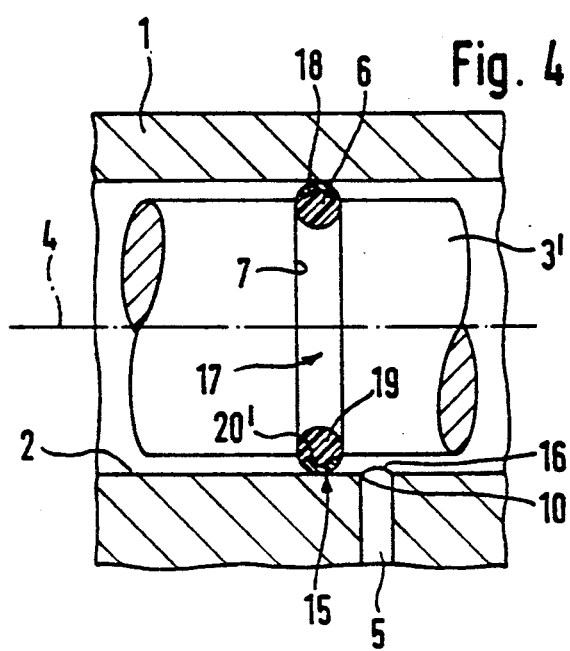
FIG. 4 represents a further working embodiment of the sealing ring in accordance with the invention as fitted ready for use on a valve member, the valve being shown in a diagrammatic longitudinal section.

FIGS. 1 and 4 of the drawing show by way of example parts of two multiway valves, in connection with which the sealing ring in accordance with the invention is to be more particularly employed. Valves of this type have a valve housing 1 with an internal receiving space 2 which may be more particularly termed a bore or hole, in which an elongated valve member 3 and 3' is arranged in such a manner that the same may be moved in the axial direction to and fro. Valve ducts 5 open laterally into the receiving space, which may be connected and disconnected from each other in part as regards the passage of fluid by the selection of the respective position of the valve member 3 and 3'. Valves of this type are conventional and the design thereof is familiar to the man in the art so that a detailed account of their structure and functions is not called for.

In order to maintain a sealing effect between the individual port parts of the valve ducts 5 in the receiving space 2 and/or in order to provide a sealing acting between the valve member 3 and 3' and the valve housing 1 or, respectively, a part thereof the invention provides at least one sealing ring 6. This ring extends in the circumferential direction about the respective valve member 3 and 3'. The number of the sealing rings is dependent on the type of valve. Each sealing ring is retained in a recess or a depression 7, which is provided either in the valve housing or in the valve member, see FIG. 1 and, respectively, 4.

In the case of the valve in accordance with FIG. 1, a plurality of retaining depressions 7 are distributed along the receiving space 2 an inner circumferential wall surface. They are annular and uninterrupted in the circumferential direction and furthermore coaxial to the valve member 3. The valve member 3 has a plurality of longitudinal sections 8 with a larger diameter by means of which it runs on the inner wall surface of the receiving space 2, preferably with a sliding fit, such sections being separated from each other by longitudinal sections 9 with a smaller diameter or, respectively, cross section. When the valve member 3 is slid, the edges 10 in the vicinity of transitions between the longitudinal sections 8 and 9 with different diameters axially abut the sealing rings 6, which project somewhat radially into the receiving space 2 in the depressions 7 in order to deform the latter radially outwards during the course of further motion, the edges simultaneously riding over the respective sealing ring 6. An intermediate stage of this motion is shown in detail in FIG. 2. The contact zone between the edges and, respectively, the rims 10 and the inner circumferential extent 14 is in this case particularly liable to wear.

In the illustrated working embodiment of FIG. 4 a sealing ring 6 is shown retained in an annular groove 7 in the valve member so that the ring radially projects past the adjacent circumferential face of the valve member 3', the projecting parts being considerably exaggerated in the figure in comparison with the other working embodiments. When the valve member 3' is displaced, the sealing ring 6 will slide so that its outer circumferential face 15 runs on the inner wall surface of the receiving space 2, it also sweeping past the ports 16 of any valve ducts 5 which may be present. When such sweeping motion takes place there is the problem of wear owing to contact with the edges or rims 10', which are generally sharp, at the ports 16.

In order to reduce such wear and in order to permanently maintain the sealing function the invention provides a permanently mounted anti-friction layer 18 on the inner circumferential extent (FIGS. 1 and 2) or of the outer circumferential extent (FIG. 4) on the respective sealing ring 6, such circumferential extent being opposite to the floor 17 of the respective depression in the operational position thereof. This anti-friction layer consists of a harder material than the material of the remainder of the part, forming a basic body 19, on the respective sealing ring, and simultaneously more particularly has elastomeric properties. The above noted floor of the depressions 17 is, in the case of the depressions in the housing in accordance with FIGS. 1 and 2, in the radially outer part of the depressions and in the illustrated working embodiment of FIG. 4 in the radially inner part of the depression.

It is by means of its sealing member 19 that the sealing ring 6 is retained in its depression 7, and with it extends at least partially and preferably to a major extent radially into the depression 7. The elastic sealing member 19, which occupies the greater part of the cross section of the sealing ring, in the present case serves to provide a resilient attachment of the anti-friction layer 18 which is accordingly able to be moved radially elastically in a resilient manner and in this manner, may readily take into account any changes in the outline of the valve component moving in relation to it. The sealing member 19 is best manufactured of rubber or a rubber-like synthetic resin material, whereas the anti-friction layer is also manufactured of synthetic resin, but is harder than the member 19, as for instance of a polyester elastomer. The anti-friction layer could also however be manufactured of a thin flexible metal layer.

The anti-friction layer 18 is preferably in the form of an uninterrupted or complete ring, it being arranged coaxially in relation to associated sealing member 19. In the illustrated working embodiment of FIGS. 1 and 2 it is incorporated in the inner circumferential surface of the sealing member 19 (recess 20) so that its surface adjacent to the valve member 3 is flush to the adjacent surface parts of the sealing member 19. A corresponding structure is to be seen in the illustrated working embodiment of FIG. 4, but here the recess 20' is provided in the outer circumferential extent, adjacent to the surface of the inner wall of the receiving space 2, of the sealing member 19. In both cases the anti-friction layer 19 is preferably permanently connected with the sealing member 19, for instance by injection molding, co-vulcanizing or bonding of the two parts. Both parts may furthermore be integrally connected together. A firm connection is important in order to prevent the anti-friction layer 18 being torn off the sealing member 19 on contact with the edges 10 and 10'.

Figure 3:
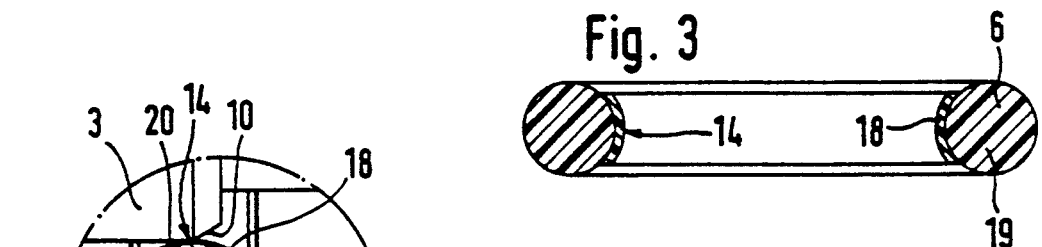
FIG. 3 shows a further working embodiment of the invention taken along a parting plane which extends radially and axially.

In the illustrated working embodiment of FIG. 3, the anti-friction layer, which takes the form of a ring, constitutes a sealing member cover, which is arranged on the inner circumferential extent of the sealing member 19, which practically has the sealing cover mounted on it. It would also be appropriated to speak of a coating.

The result of this structure is that on actuating the valve member 3 and 3' the edges 10 and 10' or the like on the sealing ring only come into engagement with the anti-friction layer 18, which owing to the selection of the material is very resistant to wear and, more particularly owing to the resilient attachment or positioning, in addition has a sealing action.

It is also possible for the respective anti-friction layer 19 to be produced as an originally strip-like, which has been bent into the form of a ring.

In a cross section of the respective sealing ring, as illustrated in FIGS. 1 through 4, the breadth of the anti-friction layer 18 preferably occupies only a fraction of the circumferential extent of the sealing ring and in the present case approximately ¼ thereof. It is an advantage furthermore if the anti-friction layer 18 as seen in the above noted cross section is arched towards the valve element having the above noted edges 10 and 10'. In the illustrated working embodiments of FIGS. 3 and 4 the arched curvature preferably complies with the curvature of the sealing member 19, which is circular in cross section. The arched form offers the advantage that the edge engagement then takes place gradually when the valve member 3 and 3' is moved.

Figure 2:
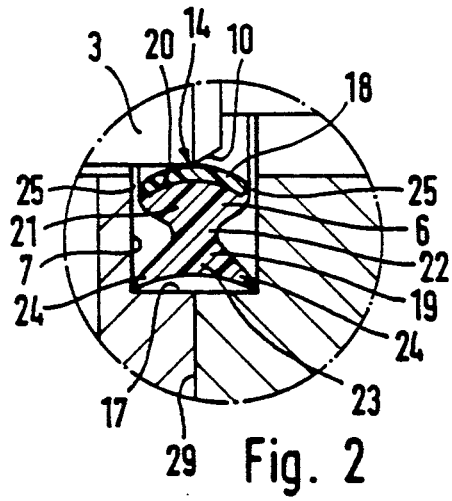
FIG. 2 shows one of the sealing rings in accordance with FIG. 1 in cross section as marked II to indicate further details of design.

The individual sealing rings 6 as shown in FIG. 1 are only illustrated diagrammatically; and for instance they may have a structure in accordance with FIG. 3 and in the present working embodiment they are designed in accordance with the illustrated working embodiment of FIG. 2. Accordingly the sealing member 19 has an inner annular section 21, on the anti-friction layer side, which in cross section is approximately oval, and is adjoined via a rib part 22 by an annular section 23, which is bifurcate in cross section. The annular section 23 is adjacent to the floor of the depression 17 and has two elastic support parts 24 adjacent to the axis and between them a recess in the sealing member is present. Looked at generally the support parts 24 are in each case also annular and project like lips in each case axially and radially as regards the annular arrangement of the rib section 22. The recess located between them favors radial mobility of the sealing ring, whereas the support parts 24 simultaneously serve to retain the sealing ring in the associated depression. It is convenient if the breadth, as measured in the operational condition of the axial direction 4, of the inner annular section 21 bearing the anti-friction layer, is somewhat less than the breadth of the associated depression 7, into which this inner ring section 21 at least partly fits. It is in this manner that lateral fluid gaps 25 are formed, through which in operation the fluid controlled by the valve is able to flow into the depression 7 and is able to act on the support parts 24 pressing them towards the floor 17 of the depression. It is in this manner that during operation there is an additional retaining effect.

In order to simplify fitting the sealing ring it is possible for the valve member or, respectively, the valve housing having the depression 7 to be divided at the depression. A corresponding radially extending plane of division is illustrated in FIGS. 1 and 2 at 29. Thus it is possible to temporarily axially split the depressions for fitting and removing sealing rings.

It is convenient, more particularly, to design the anti-friction layer 18 in the form of film ring made of film or foil material. This renders possible a particularly simple method of manufacture of the sealing ring 6, which will now be described with reference to the FIGS. 5 through 8.

The first step is to take a film 30 having the desired lubricating properties.

A dent in the form of a cup is then pressed in the film along the axis 31, which is more particularly at a right angle to the surface of the film. Such pressing effect may more particularly be performed using a punch 33, the edge of the film sheet being held down in a suitable manner and if required fed into the correct position. The cup-like dent 32 (see FIGS. 6 and 7) will be seen to have a length section which is cylindrical and is indicated in FIG. 7 at a. This length section is now subdivided by being sliced at spaced positions along the axis 31, as is indicated in broken lines at 34. In the preferred embodiment of the invention the planes of division extend perpendicularly to the axis 31. The distance of the planes of division from each other will determine the eventual breadth of the anti-friction layers 8. Such cutting leads to a plurality of such film rings 35, of which one is illustrated in FIG. 8. The rings 35 may now be secured to the sealing members, which have already been produced, and it is possible to produce the sealing member by molding.

It is in this manner that it is possible to manufacture a dual material sealing ring with good sealing and running properties.

I claim:

1. A method for the manufacture of a sealing ring for valves, said sealing ring comprising a ring-shaped sealing member, on at least one of a radially inside location and a radially outside location of said sealing member there is provided a ring-like enclosed sliding layer of a foil material having a harder characteristic as compared to the material of said sealing member, comprising the steps of first forming a dent having a longitudinally extending section of an at least substantially hollow-cylindrical shape into a foil consisting of the material of the sliding layer, thereafter dividing the longitudinally extending section of the dent into layers extending transversely of a longitudinal axis of the extent of the dent to form at least one foil ring, and then fixedly connecting the at least one foil ring to the said sealing member at the at least one of said radially inside location and said radially outside location.

2. The method according to claim 1, wherein the dent is formed in the foil by pressing in a punch.

3. The method according to claim 1, wherein the edge of the foil is held during the formation of the dent.

4. The method according to claim 1, wherein the at least one foil ring is fastened to a preexisting sealing member.

5. The method according to claim 1, wherein the sealing member is injection molded to the at least one foil ring.

6. The method according to claim 1, wherein the at least one foil ring is mounted like a coating on the sealing member.

7. The method according to claim 1, wherein the at least one foil ring is embedded into the sealing member so that both peripheral surfaces are flush with one another.

8. The method according to claim 1, wherein the sealing member and the at least one foil ring are each manufactured of a plastic material, namely rubber being used as the sealing member material and a polyester elastomer being used as the foil material.

9. The method according to claim 1, wherein a metal foil is used as the foil.

* * * * *